United States Patent [19]

Srivastava

[11] Patent Number: 5,299,000
[45] Date of Patent: Mar. 29, 1994

[54] VIDEO WHITE SIGNAL COMPRESSION AND PEAKING

[75] Inventor: Gopal K. Srivastava, Arlington Heights, Ill.

[73] Assignee: Zenith Electronics Corp., Glenview, Ill.

[21] Appl. No.: 900,204

[22] Filed: Jun. 17, 1992

[51] Int. Cl.⁵ .......................... H04N 5/20; H04N 5/14
[52] U.S. Cl. ...................................... 348/627; 348/690
[58] Field of Search ............... 358/170, 168, 167, 166, 358/174, 37, 164, 27; H04N 5/14, 5/20, 5/202, 9/64

[56] References Cited

U.S. PATENT DOCUMENTS

| | | | |
|---|---|---|---|
| 3,560,645 | 2/1971 | Wallace | 358/170 |
| 4,214,272 | 7/1980 | Hapgood | 358/170 |
| 4,399,460 | 8/1983 | Harwood | 358/166 |
| 4,437,123 | 3/1984 | Harlan | 358/166 |
| 4,513,320 | 4/1985 | Reneau | 358/166 |

FOREIGN PATENT DOCUMENTS

| | | | |
|---|---|---|---|
| 0048874 | 3/1982 | Japan | 358/164 |
| 0148476 | 9/1982 | Japan | 358/170 |
| 0010978 | 1/1985 | Japan | 358/174 |
| 0268264 | 10/1989 | Japan | H04N 5/20 |
| 4077063 | 3/1992 | Japan | H04N 5/20 |

Primary Examiner—James J. Groody
Assistant Examiner—Chris Grant

[57] ABSTRACT

A video white compression and peaking arrangement comprises a plurality of inverting amplifier transistors each tied to a common threshold level. RGB input video signals are applied to the inverting amplifier transistors which are ineffective for signals below the threshold level. The transistors are progressively turned on for input signals that exceed the threshold level resulting in non-linear negative feedback signals that compress the output signals by subtraction. A tuned circuit is coupled across the input of each inverting amplifier transistor for bypassing selected frequencies from the negative feedback effect and relatively peaking those frequencies in the output signal.

5 Claims, 3 Drawing Sheets

VIDEO WHITE SIGNAL COMPRESSION AND PEAKING

BACKGROUND OF THE INVENTION AND PRIOR ART

This invention relates generally to video signals and particularly to means for compressing video white signals and improving their transient response.

Video enhancement techniques have been used for many years to improve the display characteristics of video signals on cathode ray tubes (CRTs). Due to the limitations on electron beam focusing or spot size control in CRTs, peak white signals have an annoying tendency to cause "blooming" (defocusing) of the electron beam which can seriously degrade the display. Prior art techniques have been used to control blooming by limiting the CRT beam current to an arbitrarily selected acceptable level. There are also white compression circuits which limit peak white video signals resulting in severe signal compression or "white crushing" as the beam current approaches the limit. Most prior art video compression techniques have one or more drawbacks and are often characterized by a "washed out" appearance of the video display.

Another aspect of video enhancement is generally referred to as peaking or transient improvement. Peaking is performed by sharpening video transitions, i.e. the edges of video images, to emphasize the transition. Video peaking is considered to be beneficial in many situations but may be detrimental in darker areas of the display. In accordance with the present invention, video peaking may be accomplished simultaneously with white compression.

OBJECTS OF THE INVENTION

A principal object of the invention is to provide an improved video white compression circuit.

Another object of the invention is to provide an improved video enhancement circuit in which video white compression and peaking are accomplished simultaneously.

A further object of the invention is to provide an economical and effective video white compression and peaking system.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
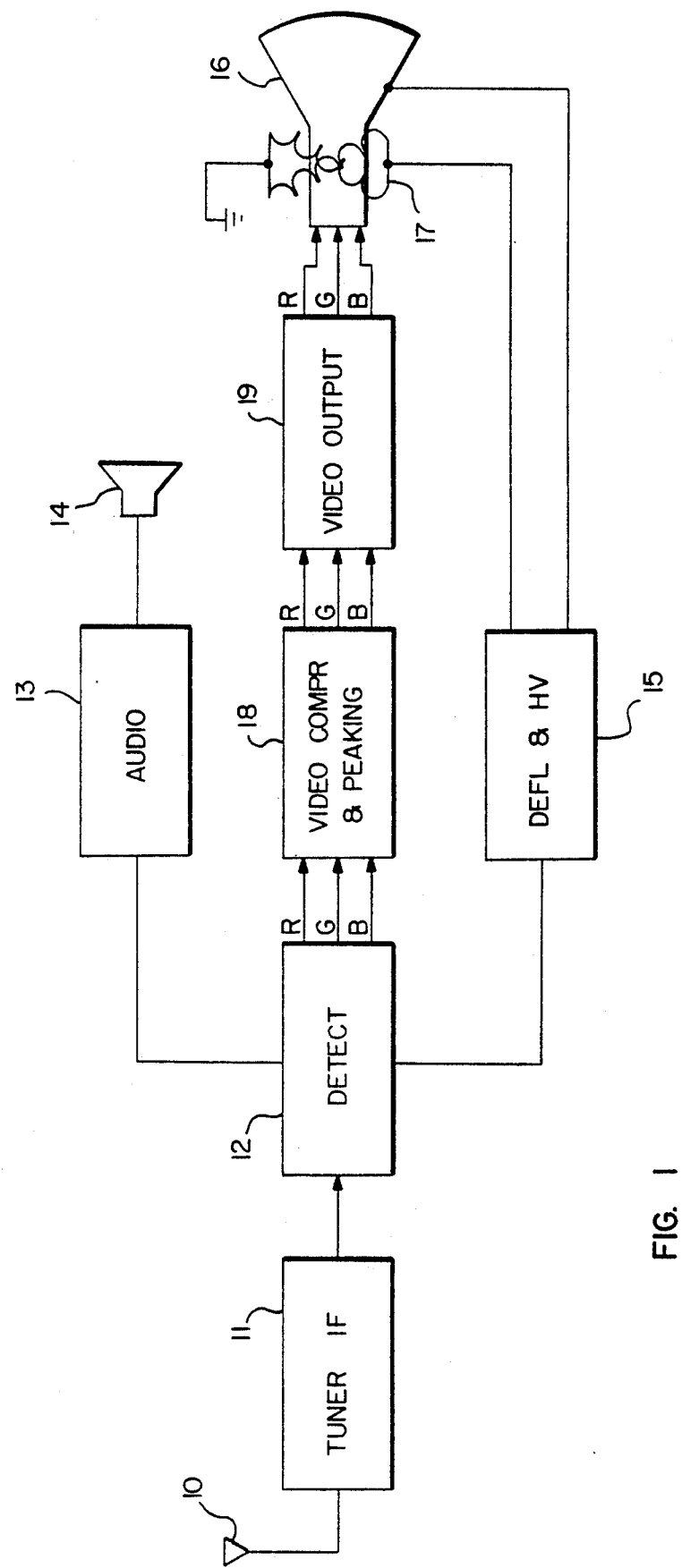
FIG. 1 is a block diagram of a television receiver including a video processor constructed in accordance with the invention.

Referring to FIG. 1, an antenna 10 receives television signals and conveys them to a tuner and IF circuit 11 where they are selected (or tuned) and converted to an intermediate frequency signal, all in a conventional manner. The depiction of an antenna 10 does not preclude other types of input signals such as those conveyed by cables. Tuner 11 is coupled to a conventional detection circuit 12 in which the video and audio signals are detected. An output of detection circuit 12 is coupled to an audio circuit 13 where the audio accompaniment of the televised signal is recovered and used to drive a loudspeaker 14. Another output of detection circuit 12 is coupled to a deflection and high voltage circuit 15 where the appropriate high voltage and deflection signals are developed and applied to a CRT 16. A pair of deflection coils 17 is provided on the neck of CRT 16 for scanning a generated cathode ray electron beam across the phosphor coated inner face thereof, all in a well known manner. The detection circuit 12 also develops three video signals labelled R, G and B for red, green and blue, respectively. The input R, G and B signals are applied to corresponding inputs of a video compression and peaking circuit 18 which includes the substance of the present invention. The output of video compression and peaking circuit 18 consists of processed R, G and B signals that have been modified in accordance with the functioning of the video compression and peaking circuit 18. These signals are applied to a video output circuit 19 where they are amplified and used as drive signals for the CRT 16. With the exception of video compression and peaking circuit 18, the above described circuit is well known in the art.

Figure 2:
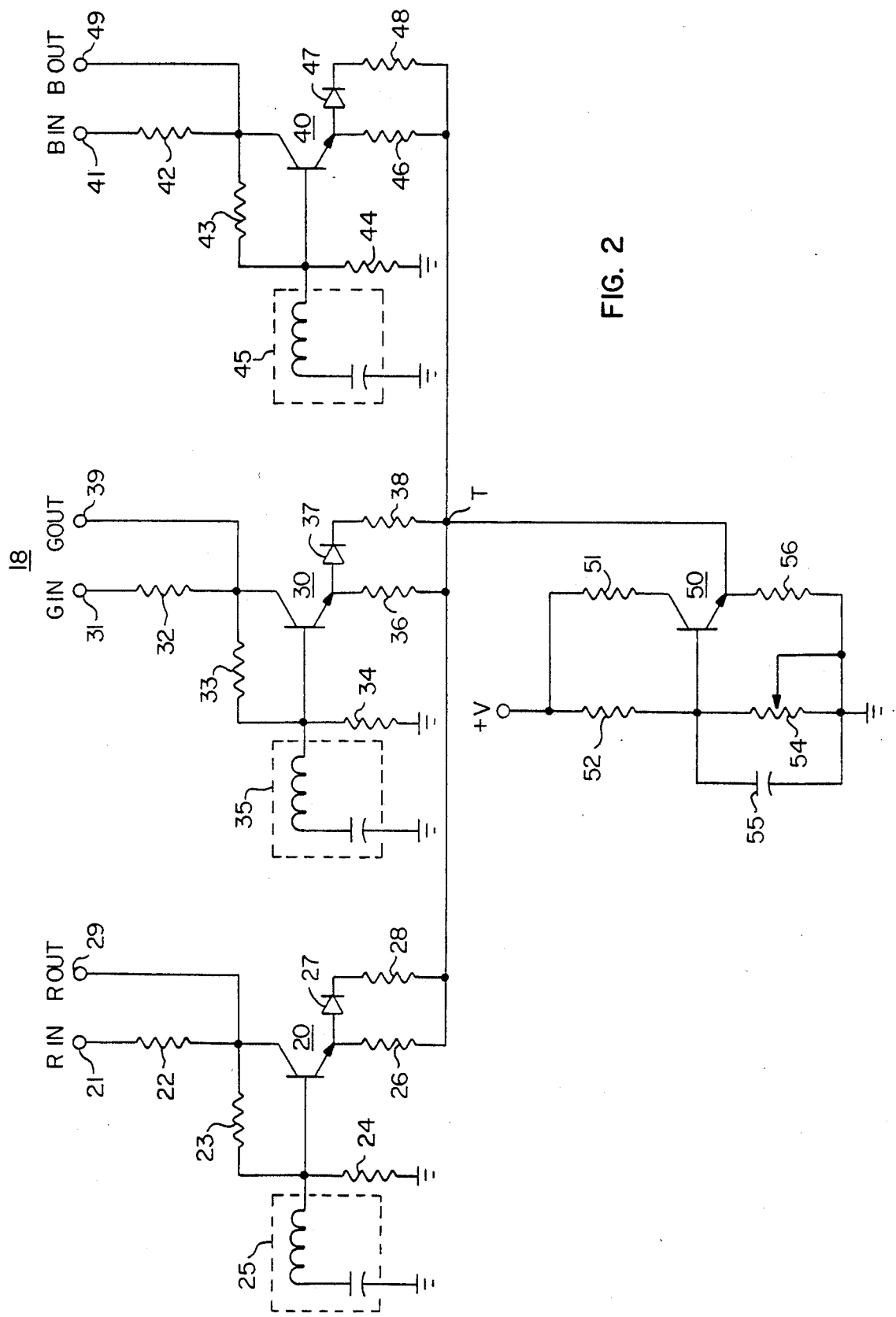
FIG. 2 is a partial schematic diagram of a video processor constructed in accordance with the invention.

In FIG. 2, video compression and peaking circuit 18 is shown in schematic form. A plurality of RGB input and output terminals are provided. For example, an R input terminal 21, a G input terminal 31 and a B input terminal 41 provide the input R, G and B signals from detection circuit 12 (FIG. 1) to the video compression and peaking circuit 18. Similarly, the R output terminal 29, the G output terminal 39 and the B output terminal 49 receive the processed R, G and B signals and supply them to video output circuit 19 (FIG. 1). The input and output terminals for each of the input R, G and B signals is bridged by a resistor with the R terminals being bridged by a resistor 22, the G terminals by a resistor 32 and the B terminals by a resistor 42. Inverting amplifiers consisting of transistors 20, 30 and 40 are provided, respectively for each of the R, G and B signals. Transistor 20 has its base connected to the junction of resistors 23 and 24, series connected between the output terminal 29 and ground. The emitter of transistor 20 is coupled via the parallel combination of a resistor 26 and a series connected diode 27 and resistor 28, to a common terminal threshold T. The base of transistor 20 is also connected to ground through a series tuned circuit 25 consisting of a small inductance and a small capacitance.

The G circuit is similar in that transistor 30 has its base connected to the junction of series connected resistors 33 and 34 and to a series tuned circuit 35 which is substantially identical to tuned circuit 25. Its emitter is connected to the combination of a resistor 36 connected in parallel with the series arrangement of a diode 37 and a resistor 38, which is also connected to threshold terminal T. Similarly, the B arrangement has the base of transistor 40 connected to the junction of resistors 43 and 44 and to a tuned circuit 45 and its emitter connected to a resistor 46 that is connected in parallel with a series combination of a diode 47 and a resistor 48, to threshold terminal T. Terminal threshold T establishes a cut-off voltage for each of transistors 20, 30 and 40, and thereby determines the R, G and B input signal levels required to initiate compression therein.

Threshold terminal T is connected to the emitter of a threshold transistor 50 that is connected between a voltage source +V and ground. Specifically, the collector of transistor 50 is connected through a resistor 51 to +V and its emitter is connected to ground through a resistor 56. A resistor 52 is connected between +V and the base of transistor 50 and the base is connected to ground through the parallel arrangement of a capacitor 55 and a potentiometer 54.

In operation (and ignoring for the moment the diode circuits parallelling the emitter resistors 26, 36 and 46), transistor 50 develops a fixed DC voltage with respect to ground at threshold terminal T. This voltage establishes the level, or threshold, at which the transistors 20, 30 and 40 will conduct. The threshold voltage is adjustable by virtue of potentiometer 54. This adjustment may be a user control, but preferably is a factory setup. The input signal on each of the input terminals R, G and B "sees" a high impedance to ground when its corresponding transistor 20, 30 and 40 is non-conductive. Transistors 20, 30 and 40 remain non-conductive or cut off for low level input signals as determined by the threshold potential at terminal T. Therefore, for signals below the threshold level, the "processed" R output signal at the R output terminal 29 is essentially the same as the input R signal and the video compression and peaking circuit is characterized by unity gain. As the input R signal, for example, increases, the potential across the input of transistor 20 exceeds the threshold potential and conduction begins in transistor 20. For very low values of signal current in its input, the transconductance impedance of transistor 20 is relatively high in comparison with the values of resistor 22 and resistor 26. Consequently, the signal developed across the emitter resistor 26 of transistor 20 is relatively small. This signal is in a negative feedback relationship with the input signal and results in the signal across the R output terminal being less than that across the R input-terminal. Thus compression of the signal begins to occur when transistor 20 goes into conduction. The transconductance of transistor 20 is such that, as it is driven further into conduction, its internal impedance decreases non-linearly to a near zero level, at which point the level of the processed signal at output terminal 29 is essentially determined by the ratio of resistors 22 and 26. It should be noted that, because of the connection of the collector of transistor 20 to its base through resistor 23, transistor 20 is never driven into saturation and white crushing does not occur. On the contrary, use of the transconductance of the transistor amplifier produces a negative feedback controlled non-linear white compression that avoids the problems of the prior art.

The series tuned circuit 25 connected across the base of transistor 20 provides a bypass for edge transition signals, i.e. signals that are of relatively high frequency, on the order of 2½ to 3½ megahertz. Bypassing this range of high frequency signals prevents the negative feedback effect caused by conduction of the inverting amplifier transistors for such signals. Thus the signal developed across the emitter resistor 26 of transistor 20 (which is negative or in inverse relationship to that across the collector resistor 22) does not reflect such high frequency signals. Consequently, the processed signal at the R output terminal 29 is not reduced for these edge transition signals and, relatively speaking, the processed output signal is peaked. To summarize, the processed output signal includes unchanged low level signals and non-linearly compressed high level signals with edge transitions relatively peaked.

Similarly, the G circuits and B circuits operate to compress their respective input signals that exceed the threshold level at terminal T in amounts that are non-linearly related to the magnitudes of the input signals and produce relative peaking of the edge transitions of the signal due to the action of the tuned bypass circuits 35 and 45, respectively, which preclude the signal frequencies associated with edge transitions from developing a negative feedback signal. The result is that video signals corresponding to black or grey areas, i.e. low amplitude video signals, that are below the threshold level are not affected by the compression circuit whereas signals above the threshold are increasingly, but non-linearly, compressed with signal increase. The arrangement facilitates the prevention of blooming in white areas and because of the non-linearity in the transconductance of the transistor amplifier yields smooth transitions. Further, signals are relatively peaked in the compressed areas by virtue of the tuned circuits which bypass the signal transients and precludes their being compressed. Thus as the input signal gets stronger (whiter) and compression becomes greater, peaking is increasingly enhanced. This is a desirable effect since peaking is especially important in areas of high brightness and is desirably enhanced for best overall viewing. Peaking in dark areas, on the other hand, is highly undesirable and with the system of the invention does not occur because video signals corresponding to such areas are below the threshold level T.

The effect of the diode circuits in parallel with the emitter resistors is to introduce an increased change in compression when the emitter voltage exceeds the diode breakdown voltage. For example, when the voltage across resistor 26 exceeds 0.6 volts, diode 27 conducts and parallels resistor 28 with resistor 26 which increases current flow in transistor 20. This results in two thresholds with differing degrees of compression. Specifically, a second threshold level is established that is 0.6 volts above the first threshold level.

Figure 3:
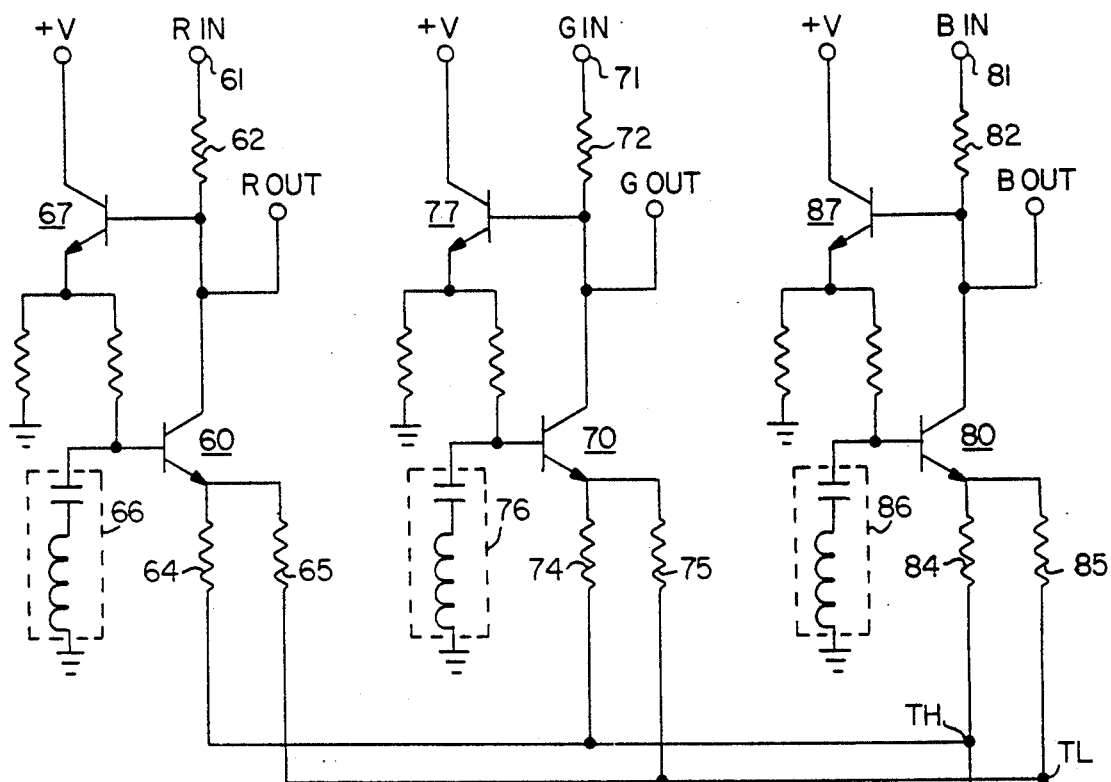
FIG. 3 is a schematic diagram of a video processor having multiple threshold levels.
Figure 3:
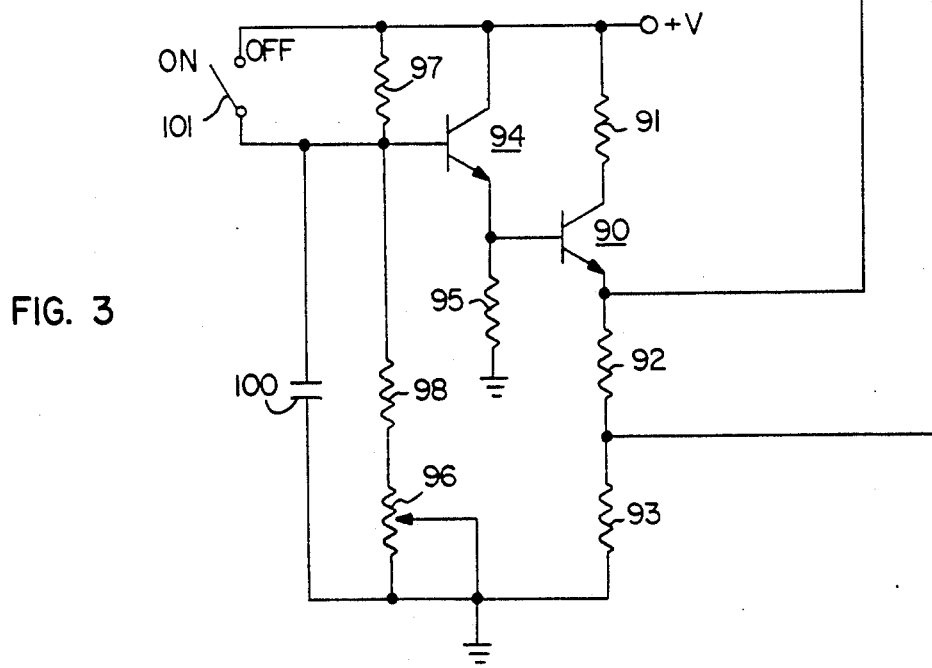

The circuit in FIG. 3 is similar to that described in FIG. 2 except that other emitter followers are used in conjunction with the compression transistors and the threshold transistors. Specifically, three compression transistors 60, 70 and 80 are provided with the R signal input terminal 61 being connected through a resistor 62 to the collector of transistor 60 and the R signal output terminal 69 being connected to its collector. An emitter follower configuration 67 is coupled between resistor 62 and the base of transistor 60 which arrangement provides bias for transistor 60. A tuned circuit 66 is connected across the base of transistor 60 to ground.

The G signal input terminal 71 is connected through a resistor 72 to the collector of transistor 70, which collector is also connected to the G output terminal 79. A similar emitter follower arrangement 77 couples the collector of transistor 70 to its base and its base is connected through a tuned circuit 76 to ground. Finally the B signal input terminal 81 is connected to the collector of transistor 80 through a resistor 82, which collector is also connected to the B signal output terminal 89. An emitter follower arrangement 87 couples the collector and base of transistor 80 and its base is connected to ground through a tuned circuit 86.

It will also be noted that a pair of emitter resistors is provided for each of transistors 60, 70 and 80, specifically emitter resistors 64 and 65 for transistor 60, emitter resistors 74 and 75 for transistor 70, and emitter resistors 84 and 85 for transistor 80. No diodes are used, rather the arrangement has separate threshold terminals at which different threshold voltages are developed. One each of the R, G and B emitter resistors is connected to a threshold terminal TH (representing threshold high) and another is connected to a threshold terminal TL (representing threshold low). The threshold high and threshold low terminals present two different threshold levels.

The threshold transistor 90 has its collector connected through a resistor 91 to a source of voltage +V and its emitter connected through a pair of series connected resistors 92 and 93, to ground. Terminal TH is coupled directly to the emitter of transistor 90 whereas terminal TL is connected to the junction of resistors 92 and 93. An emitter follower transistor 94 has its emitter connected to the base of transistor 90 and connected to ground through a resistor 95. A voltage divider arrangement consisting of a series connection of a resistor 97, a resistor 98 and a potentiometer 96 provide base potential for transistor 94. A bypass capacitor 100 couples the base to ground for bypassing signal transients. A switch 101 is connected across the collector and base of transistor 94 and when in the closed or OFF position, shorts the collector and base electrodes together. This results in transistor 94 being driven into saturation and driving transistor 90 into saturation. This action results in a high potential at both the TH and TL terminal (because of the high current flow through resistors 92 and 93) which prevents conduction in transistors 60, 70 or 80. Thus, the video compression and peaking circuit 18 is disabled when switch 101 is OFF. When the switch 101 is ON, transistor 90 conducts at a level determined by the position of the slider on potentiometer 96 and develops corresponding TH and TL voltage potentials across emitter resistors 92 and 93. When the input video signal at any of the R, G or B input terminals 61, 71 and 81 reaches a level in excess of the TL value, the respective one (or more) of transistors 60, 70 and 80 conduct and, via the negative feedback previously described, a subtraction or compression of that input signal occurs at the corresponding signal output terminal. The tuned circuits 66, 76 and 86 perform, as previously described, to bypass signal frequencies corresponding to edge transitions to increase the relative peaking of the signal during white compression. At still higher levels of input signal, the voltage at the emitter of the transistor 60, for example, will rise to a point above the threshold voltage TH where conduction will occur through resistor 64 in addition to conduction through resistor 65. Thus the current in transistor 60 sees a marked increase and produces a significant change in gain or compression characteristic between the two different threshold levels.

The dual threshold arrangements are illustrative only and may be used where the compression characteristic, although non-linear, is desired to be still further tailored to produce different levels of compression in accordance with the input signal amplitude. The basic invention, however, is directed at a single threshold level as shown in FIG. 2 when the diode circuits are omitted.

What has been described is a novel video compression and peaking system for a video signal. It is recognized that numerous changes in the described embodiment of the invention will be apparent to those skilled in the art without departing from its true spirit and scope. The invention is to be limited only as defined in the claims.

What is claimed is:

1. A video signal processor having an input terminal for receiving a video signal and an output terminal for supplying a processed video signal, comprising:
    signal attenuation means coupled between said input and said output terminals, said signal attenuation means comprising an inverting amplifier transistor coupled to said input terminal in a negative feedback arrangement for subtracting signals developed across said transistor from said input signal;
    threshold means establishing a cutoff level for said signal attenuation means, said signal attenuation means non-linearly attenuating video signals received at said input terminal that exceed said cutoff level and supplying a non-linearly compressed video signal to said output terminal; and
    means for selectively bypassing portions of said video signal at said input terminal from said transistor for enhancing the bypassed portions in said processed video signal.

2. The processor of claim 1 wherein said selectively bypassing means comprise a series tuned circuit coupled across the input of said inverting amplifier transistor.

3. The processor of claim 2 wherein said threshold means develops a second threshold level and further including means coupling said signal attenuation means through a parallel circuit to said second threshold level whereby an abrupt change in linearity occurs at said second threshold level.

4. The processor of claim 3 wherein said threshold means is adjustable for changing said cutoff level.

5. A video signal processor having an input terminal for receiving a video signal and an output terminal for supplying a processed video signal, comprising:
    inverting amplifier transistor means coupled between said input and said output terminals;
    threshold means establishing a cutoff level for conduction of said inverting amplifier transistor means;
    a series tuned circuit coupled across the input of said inverting amplifier transistor means for bypassing video signals in its frequency range; and
    said inverting amplifier transistor means conducting for video signals at said input terminal that exceed said cutoff level and non-linearly reducing the amplitude of video signals supplied to said output terminal, except for video signals in the frequency range of said series tuned circuit.

* * * * *